United States Patent
Kazim et al.

(10) Patent No.: US 9,802,278 B2
(45) Date of Patent: Oct. 31, 2017

(54) LOW MELTING POINT BRAZE ALLOY FOR HIGH TEMPERATURE APPLICATIONS

(71) Applicant: Siemens Energy, Inc., Orlando, FL (US)

(72) Inventors: Kazim Kazim, Charlotte, NC (US); Sebastian Piegert, Lübbenau (DE)

(73) Assignee: Siemens Energy, Inc., Orlando, FL (US)

( * ) Notice: Subject to any disclaimer, the term of this patent is extended or adjusted under 35 U.S.C. 154(b) by 434 days.

(21) Appl. No.: 14/690,497

(22) Filed: Apr. 20, 2015

(65) Prior Publication Data
US 2015/0224608 A1    Aug. 13, 2015

Related U.S. Application Data

(62) Division of application No. 13/467,402, filed on May 9, 2012, now Pat. No. 9,101,996.

(51) Int. Cl.
| | |
|---|---|
| B23P 6/04 | (2006.01) |
| B32B 15/01 | (2006.01) |
| C22C 19/05 | (2006.01) |
| B23K 1/00 | (2006.01) |
| B23K 35/30 | (2006.01) |
| C22C 1/02 | (2006.01) |
| B23K 101/00 | (2006.01) |
| B23K 103/08 | (2006.01) |
| B23K 103/14 | (2006.01) |
| B23K 103/18 | (2006.01) |

(52) U.S. Cl.
CPC .......... *B23P 6/045* (2013.01); *B23K 1/0018* (2013.01); *B23K 35/304* (2013.01); *B23K 35/3033* (2013.01); *B32B 15/01* (2013.01); *C22C 1/02* (2013.01); *C22C 19/05* (2013.01); *C22C 19/056* (2013.01); *B23K 2201/001* (2013.01); *B23K 2203/08* (2013.01); *B23K 2203/14* (2013.01); *B23K 2203/26* (2015.10); *Y10T 428/12944* (2015.01)

(58) Field of Classification Search
None
See application file for complete search history.

(56) References Cited

U.S. PATENT DOCUMENTS

| | | |
|---|---|---|
| 4,569,824 A | 2/1986 | Duhl et al. |
| 6,027,584 A | 2/2000 | Jackson et al. |
| 2004/0050913 A1 | 3/2004 | Philip |

FOREIGN PATENT DOCUMENTS

| | | |
|---|---|---|
| EP | 1491283 A1 | 12/2004 |
| EP | 2055424 A2 | 5/2009 |

*Primary Examiner* — Adam Krupicka

(57) ABSTRACT

A multi component braze filler alloy is described having a melting temperature less than about 1235 deg. C. and greater than about 1150 deg. C. This alloy can be processed by hot isostatic pressing (HIP) at a temperature above about 1065 deg. C. and is particularly suited for the repair of gas turbine blades and vanes, especially those made from Alloy 247. The relatively low Ti content in the present braze alloy tends to form less MC carbides at the joint interface, particularly in comparison with other braze alloys high in Zr and/or Hf. Processes for employing this braze filler alloy in processing of nickel-base superalloys, especially Alloy 247, are presented.

10 Claims, 2 Drawing Sheets

Large gap braze interface of CM 247
Superalloy with a mixture of 247 powder and braze alloy described herein.

LOW MELTING POINT BRAZE ALLOY FOR HIGH TEMPERATURE APPLICATIONS

CROSS-REFERENCE TO RELATED APPLICATIONS

This application is a divisional application of our co-pending application Ser. No. 13/467,402, filed May 9, 2012, and claims priority therefrom. The entire contents of Ser. No. 13/467,402 is incorporated herein by reference for all purposes.

BACKGROUND OF THE DISCLOSURE

1. Field of the Invention

This invention relates to the repair of superalloy components and in particular, to superalloy components used in gas turbines, and most particularly, to low melting point braze alloys for repair of such superalloy components.

2. Background and Related Art

Superalloys are typically understood to be high-temperature materials which display excellent resistance to mechanical and chemical degradation of properties even as temperatures approach the melting points of the materials. Ni superalloys are based upon nickel (Ni) and typically contain significant amounts of numerous other elements such as chromium (Cr), aluminum (Al), titanium (Ti), tungsten (W), cobalt (Co), tantalum (Ta), carbon (C), among others. The high-temperature performance of superalloys found early application in aircraft turbine engines. Since a higher operating temperature typically leads to increased fuel efficiency and lower carbon emissions, this caused superalloys to find increasing uses in ground-based turbine systems as well. For example, see The Superalloys, by Roger C. Reed, (Cambridge University Press, 2006, particularly Chapter 1). The entire content of this reference is incorporated herein by reference for all purposes.

Thus, as superalloys are used in greater numbers of airborne and ground-based turbine systems, and operated at higher temperatures, increasing numbers of blades, vanes and other components are subject to cracking and other forms of material degradation requiring repair. It is important that the repair of such turbine components be effectively carried out to result in repaired components having properties as close as possible to those of the original components.

Brazing is one important technique for repairing cracks in superalloy components that basically involves the use of a filler material introduced into the crack to be repaired, subsequently heated so as to form a bond or to repair the crack. While many brazing filler materials have been investigated, a need exists in the art for improved brazing filler materials producing better structural properties in the repaired component, reduces or avoids the formation of deleterious phases in the repaired component, is sufficiently robust for the repaired component to survive subsequent processing without serious degradation of properties, the brazing alloy melts at temperatures below the solidus of the base metal, among other characteristics required of, or desirable in, a brazing alloy and the repaired superalloy components.

BRIEF SUMMARY OF THE INVENTION

One object of the present invention is to provide a braze alloy having a melting point near the solution heat treating temperature of the base material.

Another object of the invention is to provide a braze alloy composition including alloying components of the base material.

Yet another object of the present invention is to provide a braze alloy reducing the formation of carbides at the braze site.

An additional object is to avoid the application of conventional melting point depressants such as boron or silicon.

Accordingly and advantageously, these and other advantages are achieved in accordance with the present invention as described in detail below.

DETAILED DESCRIPTION

Figure 1:
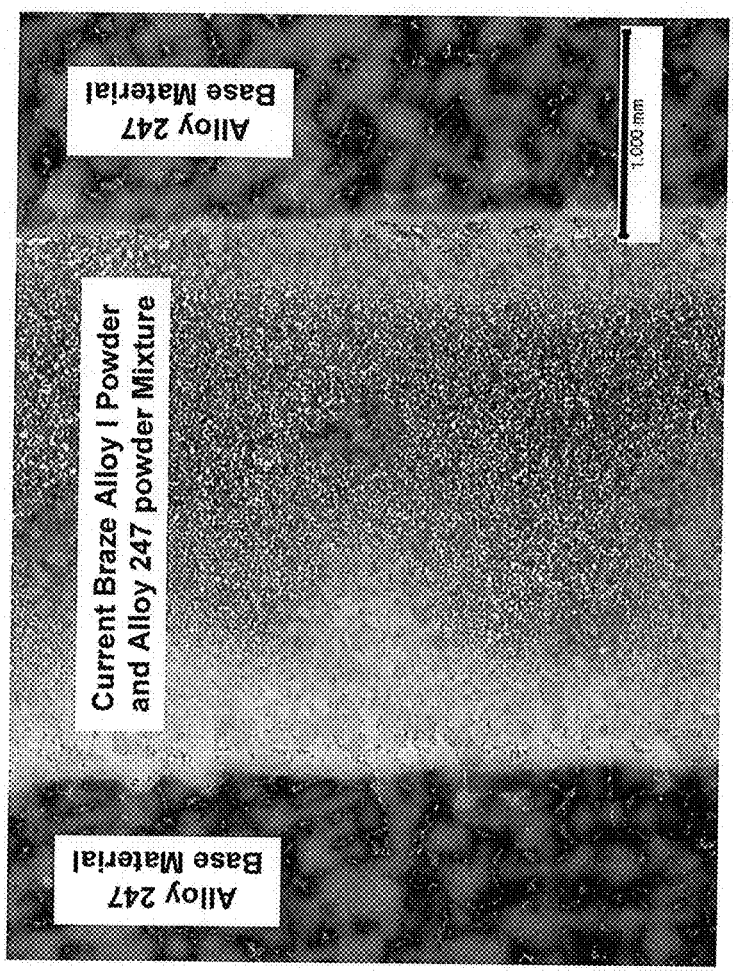
FIG. 1: Photomicrograph of exemplary large gap braze interface of CM 247 Superalloy with a mixture of 247 powder and Braze Alloy I.

A high temperature repair braze alloy is described that achieves a composition and mechanical properties near that of the base metal.

Other braze filler materials are known in the art, for example Ni—Cr—Hf (nickel-chromium-hafnium) and Ni—Cr—Zr (nickel-chromium-zirconium) materials for which it is claimed (but not verified by the present inventors) that 80% of the base metal properties are achieved in the repair of airfoils fabricated from Alloy 247 or In 738. Other known braze filler alloys include low melting joining filler alloys containing boron (B) and silicon (Si).

Boron is contraindicated in braze alloys since boron-containing compounds tend to reduce the ductility of the joint or repaired region. Braze filler materials based on Ni—Cr—Hf and Ni—Cr—Zr, as noted above, do not necessarily contain boron, but tend to form carbides at the braze joint.

The braze filler alloy described herein uses Ni—Cr—Ti (nickel-chromium-titanium) as the major components but also includes tungsten (W), manganese (Mn), tantalum (Ta), cobalt (Co), and aluminum (Al). The addition of these materials, in combination with a relatively low amount of Ti and the exclusion of substantially all B, results in increased strength over other braze materials known in the art.

Alloy 247 is an important material for the fabrication of gas turbine components. To be concrete in our descriptions, we present herein specific formulations and procedures for the repair of Alloy 247 components. However, the compositions and procedures described herein are not inherently limited to Alloy 247, but can be advantageously used for the repair of other alloys as can readily be determined by routine experimentation.

The following composition has been found to be advantageous as a braze filler alloy for use with Alloy 247. All percents are weight percents and are intended to be approximate, in which slight deviations about the quoted values are not expected to cause dramatic changes in performance or properties. A more precise range of applicability can readily be determined by routine experimentation.

Braze Alloy I:

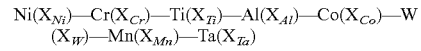

$Ni(X_{Ni})$—$Cr(X_{Cr})$—$Ti(X_{Ti})$—$Al(X_{Al})$—$Co(X_{Co})$—$W(X_{W})$—$Mn(X_{Mn})$—$Ta(X_{Ta})$ in which the weight percentages $X_z$ lie approximately in the following ranges:

Cr: 12%≤$X_{Cr}$≤16%
Ti: 13%≤$X_{Ti}$≤16%
Al: 0%<$X_{Al}$≤2%
Co: 2%≤$X_{Co}$≤4%
W: 3%≤$X_W$≤5%
Mn: 0%<$X_{Mn}$≤2%
Ta: 0%<$X_{Ta}$≤2%
Ni: $X_{Ni}$=(balance)

wherein "a<b" and "a≤b" have their conventional mathematical meaning of "a is less than b" and "a is less than or approximately equal to b" respectively.

The melting temperature for this Braze Alloy I is calculated to be in the range from approximately 1150 deg. C. to approximately 1250 deg. C. as computed using the commercially available code JMatPro.

The composition of Braze Alloy I is advantageous for the repair of Alloy 247 components for several reasons. First, Alloy 247 is conventionally heat treated at about 1235 deg. C. Thus, when applied to Alloy 247, Braze Alloy I is expected to melt and fill cracks near the heat treating temperature. Other filler materials having melting temperatures above the solution heat treat temperature tend to cause cracking in the joint.

Further, the regular two hour solution heat treat for blade material 247 is expected to cause the repair regions to be homogenized when Braze Alloy I is employed.

A laboratory study was carried out using Braze Alloy I to repair cracks on Alloy 247 with satisfactory results.

FIG. 1 shows a photomicrograph of a large gap braze joint using Braze Alloy I, brazed at a temperature of approximately 1225-1250 deg. C. for two hours. A mixture of Braze Alloy I powder and Alloy 247 was used to fill the large gap depicted in FIG. 1. Braze Alloy I melts in the intended temperature range, fills a groove used to simulate an airfoil crack and joins two surfaces of Alloy 247 blade material.

Figure 2:
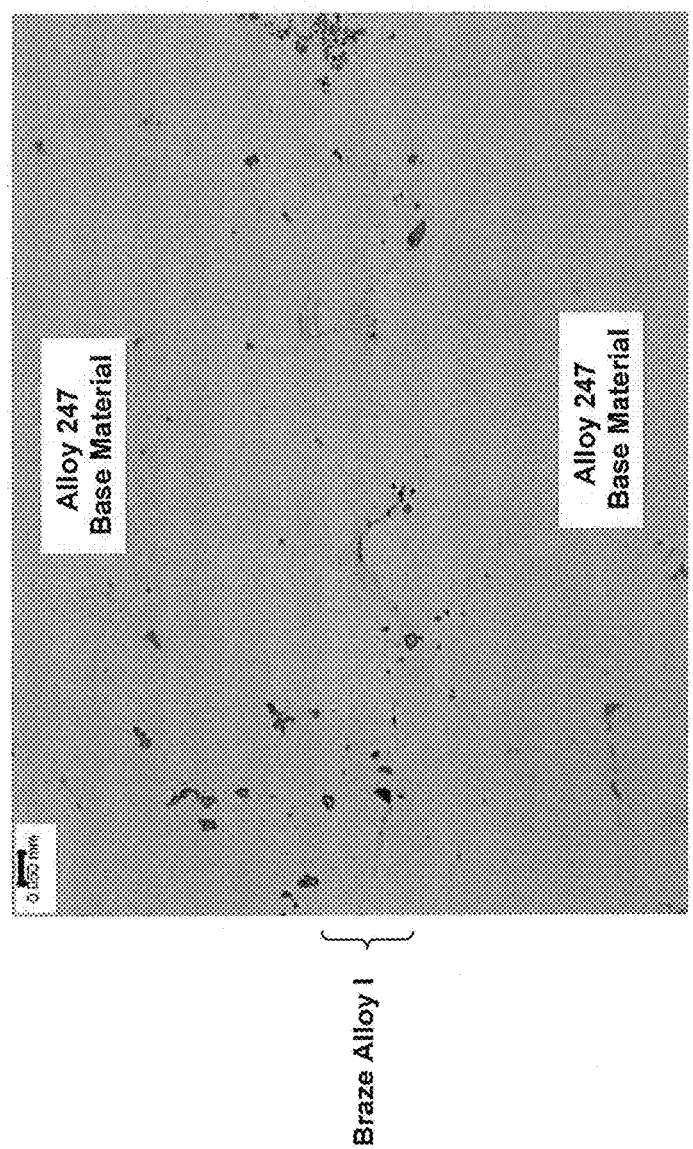
FIG. 2: Photomicrograph of exemplary narrow gap braze interface of CM 247 Superalloy with Braze Alloy I.

FIG. 2 is a photomicrograph of a narrow gap braze of a crack in Alloy 247 blade material. Since the crack depicted in FIG. 2 is narrow, it was not necessary to mix Blaze Alloy I with Alloy 247 powder. The joint shown in FIG. 2 was accomplished by the application of Braze Alloy I to a narrow-gap crack on the blade, followed by brazing at approximately 1225-1250 deg. C. 2 hours.

Although various embodiments which incorporate the teachings of the present invention have been shown and described in detail herein, those skilled in the art can readily devise many other varied embodiments that still incorporate these teachings.

What is claimed is:

1. A method for repairing at least one crack in a nickel-base superalloy component comprising:
   a) applying to said at least one crack a quantity of a braze alloy having substantially the following composition in weight percents: Ni($X_{Ni}$)—Cr($X_{Cr}$)—Ti($X_{Ti}$)—Al($X_{Al}$)—Co($X_{Co}$)—W($X_W$)—Mn($X_{Mn}$)—Ta($X_{Ta}$) wherein said weight percentages $X_z$ lie in the following ranges:
      12%≤$X_{Cr}$≤16%,
      13%≤$X_{Ti}$≤16%,
      0%<$X_{Al}$≤2%,
      2%≤$X_{Co}$≤4%,
      3%≤$X_W$≤5%,
      0%<$X_{Mn}$≤2%,
      0%<$X_{Ta}$≤2%,
      $X_{Ni}$=(balance), and;
   b) brazing said nickel-base superalloy component having said braze alloy in said at least one crack at a brazing temperature in the range from approximately 1225 deg. C. to approximately 1250 deg. C., wherein said nickel-base superalloy is not substantially damaged at said brazing temperature.

2. A method as in claim 1 wherein said nickel-base superalloy component is Alloy 247.

3. A method as in claim 2 wherein said brazing is performed for a time of approximately 2 hours.

4. A repaired nickel-base superalloy component having at least one crack therein repaired by the method of claim 1.

5. A repaired component of Alloy 247 having at least one crack therein repaired by the method of claim 2.

6. A method for repairing at least one crack in a nickel-base superalloy component comprising:
   a) preparing a braze alloy having substantially the following composition in weight percents: Ni($X_{Ni}$)—Cr($X_{Cr}$)—Ti($X_{Ti}$)—Al($X_{Al}$)—Co($X_{Co}$)—W($X_W$)—Mn($X_{Mn}$)—Ta($X_{Ta}$) wherein said weight percentages $X_z$ lie in the following ranges:
      12%≤$X_{Cr}$≤16%,
      13%≤$X_{Ti}$≤16%,
      0%<$X_{Al}$≤2%,
      2%≤$X_{Co}$≤4%,
      3%≤$X_W$≤5%,
      0%<$X_{Mn}$≤2%,
      0%<$X_{Ta}$≤2%,
      $X_{Ni}$=(balance), and;
   b) mixing said braze alloy with a powder having substantially the same composition as said nickel-base superalloy component thereby preparing a braze mixture, and;
   c) applying said braze mixture to said at least one crack, and;
   d) brazing said component having said braze mixture in said at least one crack at a brazing temperature in the range from approximately 1225 deg. C. to approximately 1250 deg. C., wherein said nickel-base superalloy is not substantially damaged at said brazing temperature.

7. A method as in claim 6 wherein said nickel-base superalloy component is Alloy 247.

8. A method as in claim 7 wherein said brazing is performed for a time of approximately 2 hours.

9. A repaired nickel-base superalloy component having at least one crack therein repaired by the method of claim 6.

10. A repaired component of Alloy 247 having at least one crack therein repaired by the method of claim 7.

* * * * *